US009657897B2

(12) United States Patent
Pan et al.

(10) Patent No.: US 9,657,897 B2
(45) Date of Patent: May 23, 2017

(54) CONNECTING DEVICE AND A GIMBAL APPARATUS

(71) Applicant: SZ DJI TECHNOLOGY CO., LTD., Shenzhen (CN)

(72) Inventors: Paul Pan, Shenzhen (CN); Yanchong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/390,768

(22) Filed: Dec. 27, 2016

(65) Prior Publication Data

US 2017/0108168 A1 Apr. 20, 2017

Related U.S. Application Data

(63) Continuation of application No. PCT/CN2014/081056, filed on Jun. 27, 2014.

(51) Int. Cl.
*G03B 17/56* (2006.01)
*F16M 13/04* (2006.01)
*F16M 11/04* (2006.01)

(52) U.S. Cl.
CPC ............ *F16M 13/04* (2013.01); *F16M 11/04* (2013.01); *G03B 17/561* (2013.01); *G03B 17/563* (2013.01)

(58) Field of Classification Search
CPC . B25J 15/026; B66C 1/32; B66C 1/64; B66C 1/62; H01L 21/68707; B25G 1/04;
(Continued)

(56) References Cited

U.S. PATENT DOCUMENTS 4,570,887 A 2/1986 Banister
5,333,023 A 7/1994 Oxford
(Continued)

FOREIGN PATENT DOCUMENTS

CN 200983065 Y 11/2007
CN 2014/081056 3/2015
JP 2002327893 A 11/2002

OTHER PUBLICATIONS

The World Intellectual Property Organization (WIPO) International Search Report for PCT/CN2014/081056 Mar. 23, 2015 p. 1-6.

*Primary Examiner* — Stephen Vu
(74) *Attorney, Agent, or Firm* — Anova Law Group, PLLC (57) ABSTRACT

A connecting device includes a connecting member, a slider, and a blocking assembly. The connecting member includes a first sliding slot and a limiting slot formed at one end of the connecting member. The slider includes a second sliding slot and an accommodating hole formed at one end of the slider. The second sliding slot is configured to slidably engage with the first sliding slot. The slider further includes a through hole formed on a side wall of the slider and configured to communicate with the accommodating hole. The blocking assembly includes a limiting button and a limiting column. The limiting button includes a transmission portion configured to be received in the through hole. The limiting column is configured to be accommodated in the limiting slot and the accommodating hole. The limiting column includes a receiving hole configured to receive the transmission portion.

12 Claims, 7 Drawing Sheets

(58) Field of Classification Search
CPC .......... F16B 7/105; A01K 87/02; F16C 11/10;
F16M 13/04; F16M 11/04; F16M 11/32;
G03B 17/561; G03B 17/563; G03B 17/56
USPC .......... D34/28, 32, 33; 254/89 H, 89 R, 134,
254/93 R; 294/139, 119.1, 81.1, 81.5
See application file for complete search history.

(56) References Cited

U.S. PATENT DOCUMENTS

| | | | | |
|---|---|---|---|---|
| 5,403,057 | A * | 4/1995 | Sugito | B25B 1/2421 |
| | | | | 269/266 |
| 5,429,490 | A * | 7/1995 | Myers | B28B 7/08 |
| | | | | 294/67.33 |
| 5,671,960 | A * | 9/1997 | Chyz | B66C 1/107 |
| | | | | 294/67.5 |
| 5,997,064 | A * | 12/1999 | Orita | B66C 1/445 |
| | | | | 294/119.1 |
| 8,226,140 | B1 * | 7/2012 | Dietrich | B66C 1/107 |
| | | | | 294/119.1 |
| 2014/0130334 | A1 | 5/2014 | Chun | |

* cited by examiner

CONNECTING DEVICE AND A GIMBAL APPARATUS

CROSS-REFERENCE TO RELATED APPLICATION

This is a continuation application of International Application No. PCT/CN2014/081056, filed on Jun. 27, 2014, the entire contents of which are incorporated herein by reference.

TECHNICAL FIELD

The present disclosure relates to imaging devices, and in particular to a connecting device and a gimbal apparatus.

BACKGROUND OF THE DISCLOSURE

An imaging device can comprise a gimbal and imaging filming device carried on the gimbal. A gimbal can carry the filming device, adjust an attitude of the filming device, and stabilize the filming device at an attitude. For example, the gimbal can change a height and/or an orientation of the filming device and maintain the filming device at the changed attitude. The filming device can be effectively stabilized by the gimbal to smooth an image capturing and effect a multi-angle image capturing. In general, a gimbal can be compatible with various types of cameras and lenses.

When a conventional gimbal is used for capturing images, the gimbal is either fixedly connected with an onboard supporting device or a handheld supporting device, and thus can be used either onboard or by hand. A user may have to prepare a plurality of sets of gimbal and supporting device for filming in various scenarios, which is inconvenient and not cost-effective.

SUMMARY OF THE DISCLOSURE

The present disclosure provides a connecting device and a gimbal, enabling a releasable connection between the gimbal and various supporting devices in different scenarios.

In accordance with the present disclosure, there is provided a connecting device including a connecting member, a slider, and a blocking assembly. The connecting member includes a first sliding slot and a limiting slot formed at one end of the connecting member. The slider includes a second sliding slot and an accommodating hole formed at one end of the slider. The second sliding slot is configured to slidably engage with the first sliding slot. The slider further includes a through hole formed on a side wall of the slider and configured to communicate with the accommodating hole. The blocking assembly includes a limiting button and a limiting column. The limiting button includes a transmission portion configured to be received in the through hole and be guided to slide in the through hole. The limiting column is configured to be accommodated in the limiting slot and the accommodating hole. The limiting column includes a receiving hole configured to receive the transmission portion.

In some embodiments, the first sliding slot includes a sliding guide slot formed by a first protrusion portion and a second protrusion portion arranged opposite to each other at the one end of the connecting member. The second sliding slot includes a sliding protrusion configured to engage with the sliding guide slot.

In some embodiments, the connecting device further includes a clamping block and a clamping bolt. The connecting member further includes a receiving recess formed on a side wall of the connecting member and through the first protrusion portion. The receiving recess is configured to receive the clamping block and includes a bolt hole formed at a bottom of the receiving recess. The clamping block includes a through hole corresponding to the bolt hole. The clamping bolt is configured to pass through the through hole and fit in the bolt hole. The clamping block includes an abutting protrusion at one end of the clamping block. The abutting protrusion is configured to abut against the sliding protrusion.

In some embodiments, the connecting device further includes an elastic member. One end of the elastic member is arranged in the accommodating hole and another end of the elastic member is connected to the limiting column.

In some embodiments, the first sliding slot and the second sliding slot include dovetail slots or T-slots configured to engage with each other.

In some embodiments, the connecting member further includes a fastening portion formed at another end of the connecting member and configured to engage with an external supporting device.

In some embodiments, the fastening portion includes a clamping hole and a through slot. The through slot is formed at one side of the fastening portion and configured to communicate with the clamping hole and to be locked by a screw.

In some embodiments, the slider further includes a locking member formed at another end of the slider and configured to lock an external device.

In some embodiments, the limiting button further includes a sliding portion connected to the transmission portion.

Also in accordance with the present disclosure, there is provided a gimbal apparatus including a supporting device, an imaging adjusting device, and a connecting device configured to connect the supporting device and the imaging adjusting device. The connecting device includes a connecting member, a slider, and a blocking assembly. The connecting member includes a fastening portion formed at a first end of the connecting member and configured to engage with the supporting device, and a first sliding slot and a limiting slot formed at a second end of the connecting member. The slider includes a second sliding slot and an accommodating hole formed at a first end of the slider. The second sliding slot is configured to slidably engage with the first sliding slot. The slider further includes a locking member formed at a second end of the slider and configured to lock the imaging adjusting device, and a through hole formed on a side wall of the slider and configured to communicate with the accommodating hole. The blocking assembly includes a limiting button and a limiting column. The limiting button includes a transmission portion configured to be received in the through hole and be guided to slide in the through hole. The limiting column is configured to be accommodated in the limiting slot and the accommodating hole. The limiting column includes a receiving hole configured to receive the transmission portion.

In some embodiments, the first sliding slot includes a sliding guide slot formed by a first protrusion portion and a second protrusion portion arranged opposite to each other at the second end of the connecting member. The second sliding slot includes a sliding protrusion configured to engage with the sliding guide slot.

In some embodiments, the connecting device further includes a clamping block and a clamping bolt. The connecting member further includes a receiving recess formed on a side wall of the connecting member and through the first protrusion portion. The receiving recess is configured to receive the clamping block. The receiving recess includes a bolt hole formed at a bottom of the receiving recess. The clamping block includes a through hole corresponding to the bolt hole. The clamping bolt is configured to pass through the through hole and fit in the bolt hole. The clamping block includes an abutting protrusion at one end of the clamping block. The abutting protrusion is configured to abut against the sliding protrusion.

In some embodiments, the connecting device further includes an elastic member. One end of the elastic member is arranged in the accommodating hole, and another end of the elastic member is connected to the limiting column.

In some embodiments, the first sliding slot and the second sliding slot include dovetail slots or T-slots configured to engage with each other.

In some embodiments, the fastening portion includes a clamping hole and a through slot. The through slot is formed at one side of the fastening portion, and is configured to communicate with the clamping hole and to be locked by a screw.

In some embodiments, the limiting button further includes a sliding portion connected to the transmission portion.

Consistent with embodiments of the present disclosure, components such as dovetail slot and T-slot and components for limiting positions are used to enable quick disassembly and quick assembly of a gimbal, such that the gimbal can be rapidly dismounted from and mounted on various supporting devices such as those used on aerial vehicles, handheld devices, and vehicles. Consistent with embodiments of the present disclosure, a guiding is implemented by structures such as a dovetail slot and a T-slot. A direction of adjustment is determinate and an operation is easy.

DETAILED DESCRIPTION OF THE EMBODIMENTS

Embodiments consistent with the present disclosure will be described in detail below with reference to the drawings. It is apparent that embodiments as described are only some rather than all of the embodiments of the present disclosure. It is intended that any variation or change made without departing from the disclosure is within the scope of the disclosure.

In some embodiments of the present disclosure, a quick assembly and a quick disassembly of a gimbal with an external supporting device can be effected by an engagement between sliding slots such as a dovetail slot and a T-slot, in combination with a blocking assembly.

FIGS. 1 to 5 are views showing components of a connecting device according to an embodiment of the present disclosure. The connecting device consistent with the present disclosure can be used in with a device, such as a gimbal, to be connected with an external supporting device. In some embodiments, the connecting device can comprise a connecting member 10, a slider 20, and a blocking assembly 30. The connecting member 10 can be fixed to the external supporting device. The slider 20 can be connected with the device to be supported, such as a rotating shaft of the gimbal. The blocking assembly 30 can restrict a relative position between the connecting member 10 and the slider 20 when the connecting member 10 is slidably engaged with the slider 20.

In some embodiments, the blocking assembly 30 can comprise a limiting column 301 and a limiting button 302. The limiting button 302 can comprise a sliding portion 3021 and a transmission portion 3022. The limiting column 301 can be provided with a receiving hole 3011 for receiving the transmission portion 3022.

One end, i.e., a first end, of the connecting member 10 can be provided with a fastening portion 101 configured to engage with the external supporting device, and another end, i.e., a second end opposite to the first end, of the connecting member 10 can be provided with a first sliding slot 102 and a limiting slot 103 for accommodating the limiting column 301.

One end, i.e., a first end, of the slider 20 can be provided with a second sliding slot 201 configured to slidably engage with the first sliding slot 102 and an accommodating hole 202 for accommodating the limiting column 301. A side wall of the slider 20 can be provided with a through hole 203, which communicates with the accommodating hole 202 and is configured to receive the transmission portion 3022. The through hole 203 can guide the transmission portion 3022 to slide in the through hole 203.

In some embodiments, another end, i.e., a second end, of the slider 20 can be provided with a locking member (not shown) for locking an external device.

As shown in FIGS. 1 to 5, the limiting column 301 can be provided in a cylindrical shape. Correspondingly, the limiting slot 103, which is provided at the connecting member 10 and configured to accommodate the limiting column 301, can be a circular slot. The limiting slot 103 can accommodate a portion of the limiting column 301. The accommodating hole 202, which is provided on the slider 20, can be circular. A depth of the accommodating hole 202 can be greater than a length of the portion of the limiting column 301 inserted in the circular accommodating hole 202, such that the limiting column 301 can slide in the accommodating hole 202. In some embodiments, the limiting column 301 can have a prism shape, and the limiting slot 103 can have a shape corresponding to the prism shape of the limiting column 301.

The sliding portion 3021 and the transmission portion 3022 of the limiting button 302 can be perpendicular to and fixedly connected to each other. The transmission portion 3022 can be provided as a cylinder, and the through hole 203 on the side wall of the slider 20 can have an oval shape. A length of the oval-shaped through hole 203 can be greater than a diameter of a bottom side of the cylinder-shaped transmission portion 3022, such that the transmission portion 3022 can slide in the oval-shaped through hole 203. The receiving hole 3011 provided on the limiting column 301 can have a circular shape. The transmission portion 3022 of the limiting button 302 can pass through the through hole 203, and then be inserted into the receiving hole 3011. The limiting column 301 can be pulled out from the limiting slot 103 of the connecting member 10 after the transmission portion 3022 slides along the through hole 203, such that the entire slider 20 can slide along the connecting member 10 so as to be separated from the connecting member 10. In some embodiments, the transmission portion 3022 can have a prism shape, and the through hole 203 on the side wall of the slider 20 and the receiving hole 3011 on the limiting column 301 can be holes of corresponding shapes.

In some embodiments, the connecting device can further comprise an elastic member (not shown). One end of the elastic member can be arranged in the accommodating hole 202, and the other end of the elastic member can be connected to the limiting column 301. In some embodiments, the elastic member can be a spring. After the limiting column 301 slides out of the limiting slot 103 of the connecting member 10, the elastic member can push the limiting column 301 back into the limiting slot 103 when a user releases the sliding portion 3021. According to the present disclosure, other approaches can be adopted for pulling out and restoring the limiting column 301. For example, the through hole 203 on the side wall of the slider 20 can be a T-shaped hole. The user can move the blocking assembly 30 in the T-shaped hole to keep the limiting column 301 in the limiting slot 103 of the connecting member 10 or pull the limiting column 301 out of the limiting slot 103.

The blocking assembly 30, when assembled with the slider 20 and the connecting member 10, can prevent the slider 20 from sliding along a guiding direction of the sliding slots 102, 201, such that a connection between the slider 20 and the connecting member 10 is reliable and stable.

Figure 1:
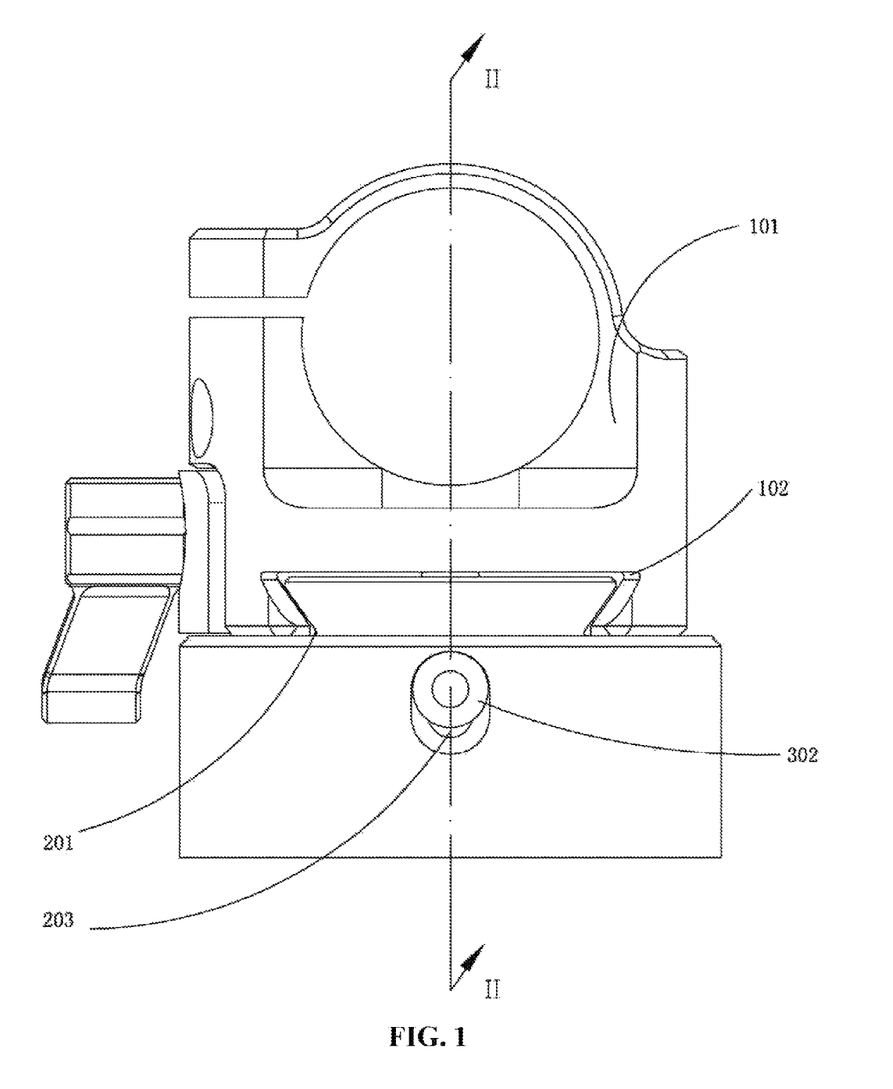
FIG. 1 is a view showing a structure of a connecting device according to an embodiment of the present disclosure.
Figure 2:
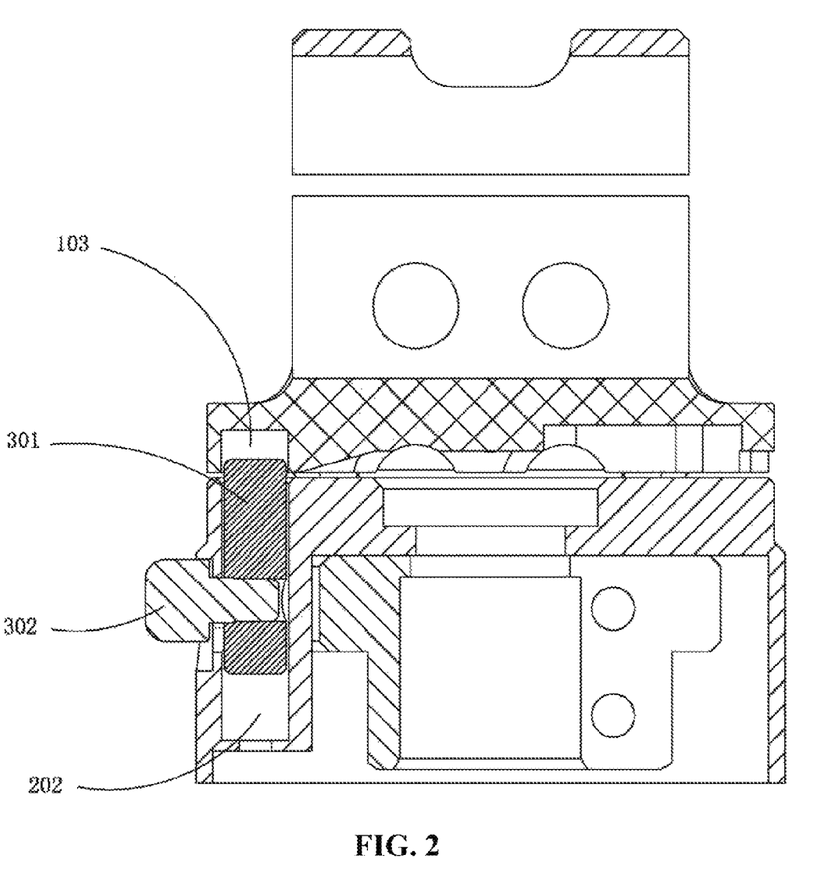
FIG. 2 is a sectional view of the connecting device in II-II direction according to an embodiment of the present disclosure.
Figure 3:
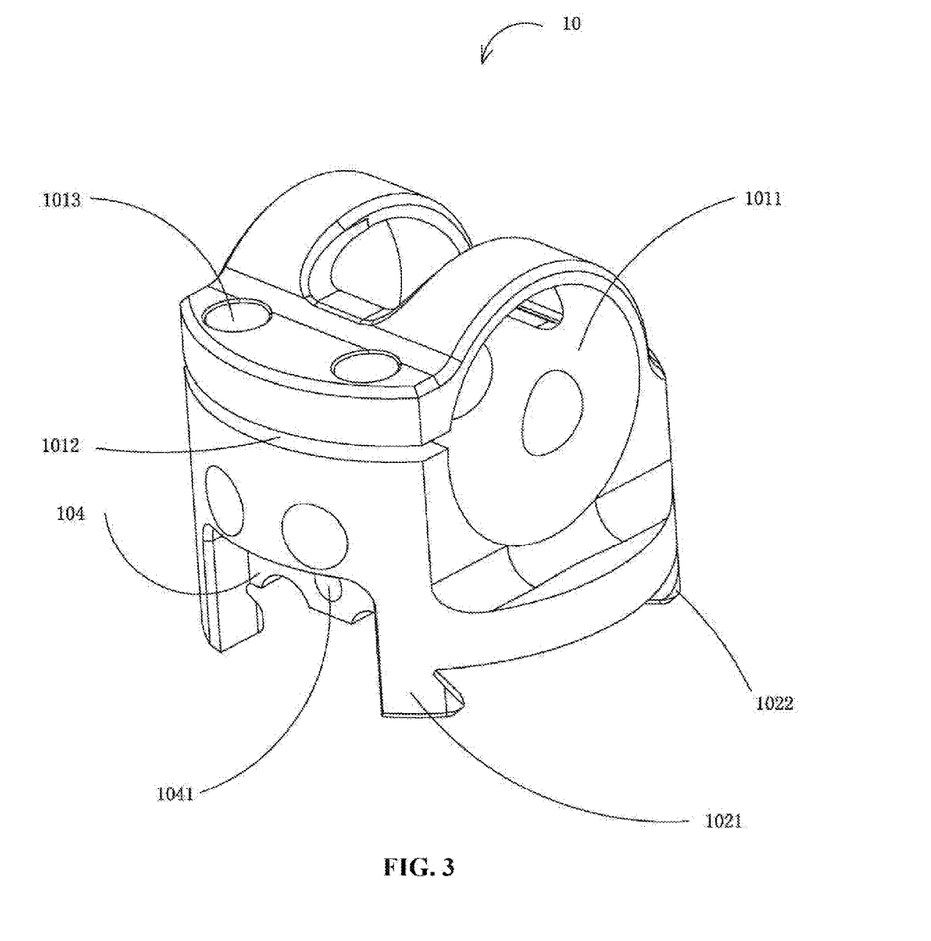
FIG. 3 is a view showing a structure of a connecting member of the connecting device according to an embodiment of the present disclosure.
Figure 4:
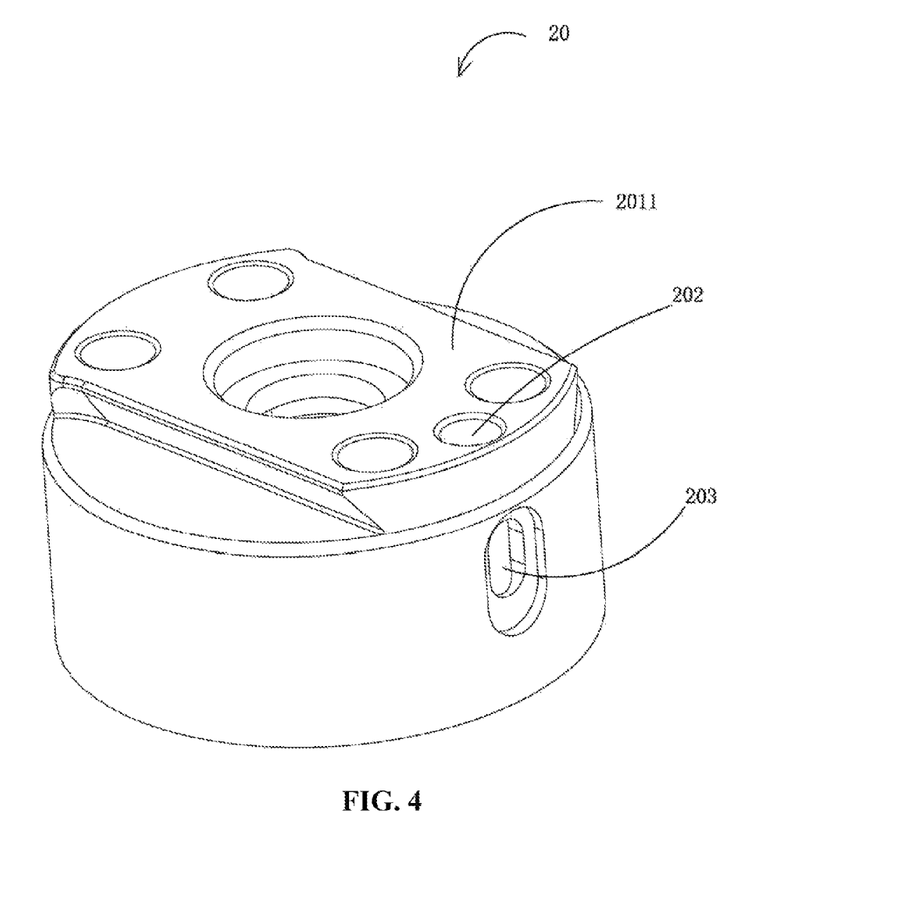
FIG. 4 is a view showing a structure of a slider of the connecting device according to an embodiment of the present disclosure.
Figure 5:
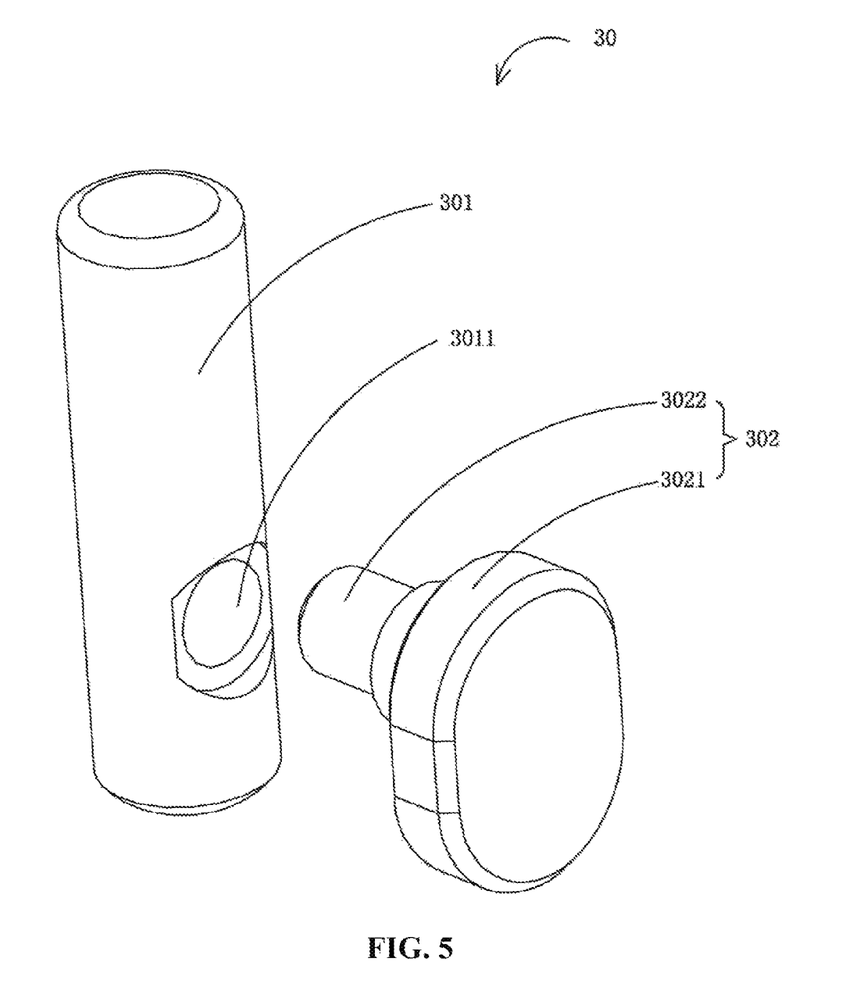
FIG. 5 is a view showing a structure of a blocking assembly of the connecting device according to an embodiment of the present disclosure.

As shown in FIGS. 3 and 4, the first sliding slot 102 of the connecting member 10 can be a sliding guide slot formed by a first protrusion portion 1021 and a second protrusion portion 1022 arranged opposite to each other at the second end of the connecting member 10. The second sliding slot 201 of the slider 20 can be a sliding protrusion 2011 configured to engage with the sliding guide slot enclosed by the first protrusion portion 1021 and the second protrusion portion 1022.

In some embodiments of the present disclosure, the first sliding slot 102 and the second sliding slot 201 are dovetail slots configured to engage with each other, as shown in FIGS. 3 and 4. In other embodiments, the first sliding slot 102 and the second sliding slot 201 can be T-slots configured to engage with each other.

Figure 6:
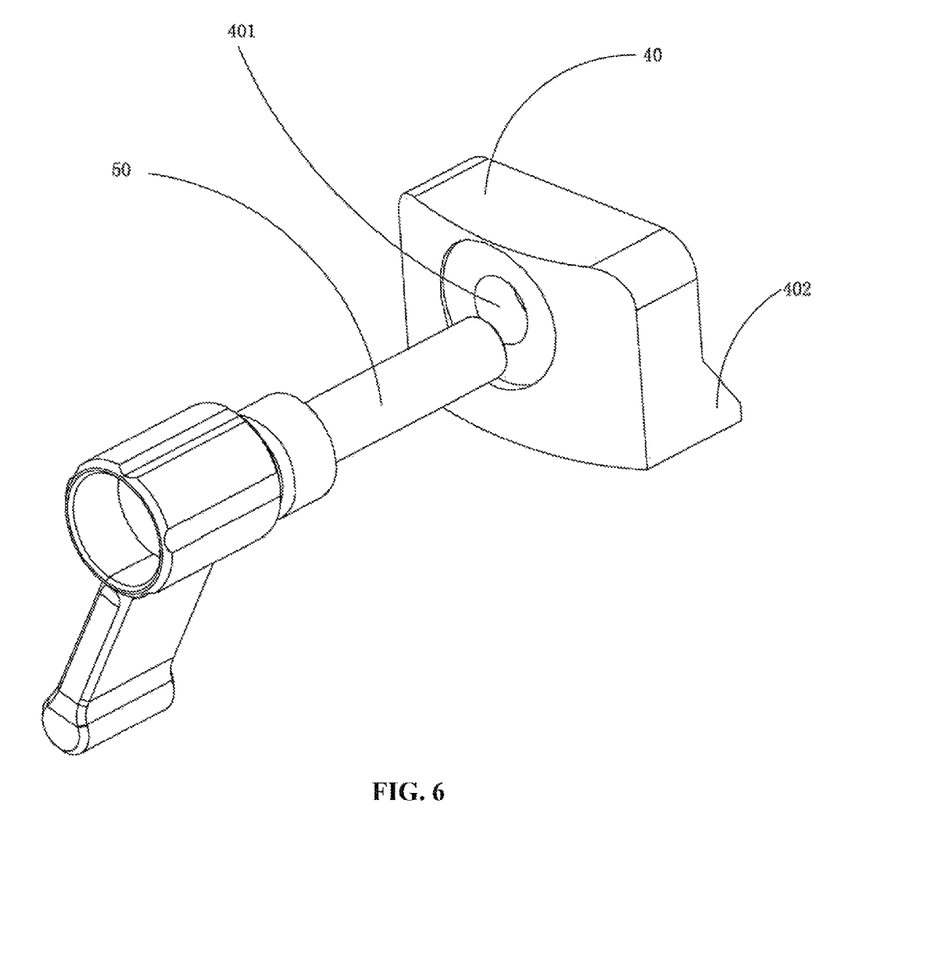
FIG. 6 is a view showing a structure of a clamping block and a clamping bolt of the connecting device according to an embodiment of the present disclosure.

Referring to FIG. 6, the connecting device consistent with the present disclosure can further comprise a clamping block 40 and a clamping bolt 50. A side wall of the connecting member 10 can be provided with a receiving recess 104 formed through the first protrusion portion 1021 and configured to receive the clamping block 40. A bolt hole 1041 can be provided at a bottom of the receiving recess 104. The clamping block 40 can be provided with a through hole 401 which corresponds to the bolt hole 1041. The clamping bolt 50 can pass through the through hole 401 and fits in the bolt hole 1041. One end of the clamping block 40 can comprise an abutting protrusion 402 that abuts against the sliding protrusion 2011 of the slider 20.

The abutting protrusion 402 is provided on an abutting surface of the clamping block 40 that contacts the bottom of the receiving recess 104 of the connecting member 10. A distance between a vertex of the abutting protrusion 402 and the abutting surface can be a first distance. As shown in FIG. 3, the first protrusion portion 1021 includes a corner structure that forms a slide rail of the first sliding slot 102. The corner structure can include an extension portion protruding toward the second protrusion portion 1022. A distance between a vertex of the extension portion and a bottom of the corner structure can be a second distance. The first distance can be slightly greater than the second distance, such that the abutting protrusion 402 can better abut against the sliding protrusion 2011 of the slider 20. In this way, the slider 20 can be better fixed in the sliding slot 102 formed by the first protrusion portion 1021 and the second protrusion portion 1022, and a connection between the slider 20 and the sliding slot 102 is reliable and stable.

In some embodiments, as shown in FIG. 3, the fastening portion 101 of the connecting member 10 can include a clamping hole 1011. A side of the fastening portion 101 can be provided with a through slot 1012 which communicates with the clamping hole 1011. The through slot 1012 can be locked by a screw.

The through slot 1012 can be locked by one or more screws. The fastening portion 101 can be provided with at least one screw through-hole 1013 that communicates with the through slot 1012 from one side of the through slot 1012. The fastening portion 101 can be provided with a screw hole (not shown) at a position on the other side of the opening 1012 that corresponds to the screw through-hole 1013. The screw can be inserted through the screw through-hole 1013 and fits in the screw hole, so as to fasten and lock the through slot 1012.

Consistent with embodiments of the present disclosure, components such as dovetail slot and T-slot and components for limiting positions are used to enable quick disassembly and quick assembly of a gimbal, such that the gimbal can be rapidly dismounted from and mounted on various supporting devices, such as those used on aerial vehicles, handheld devices, and vehicles. Consistent with embodiments of the present disclosure, a guiding is implemented using structures such as a dovetail slot and a T-slot. A direction of adjustment is determinate and an operation is easy. Furthermore, a locking mechanism having a clamping block is used to provide a reliable and stable connection, which is easy to operate.

Figure 7:
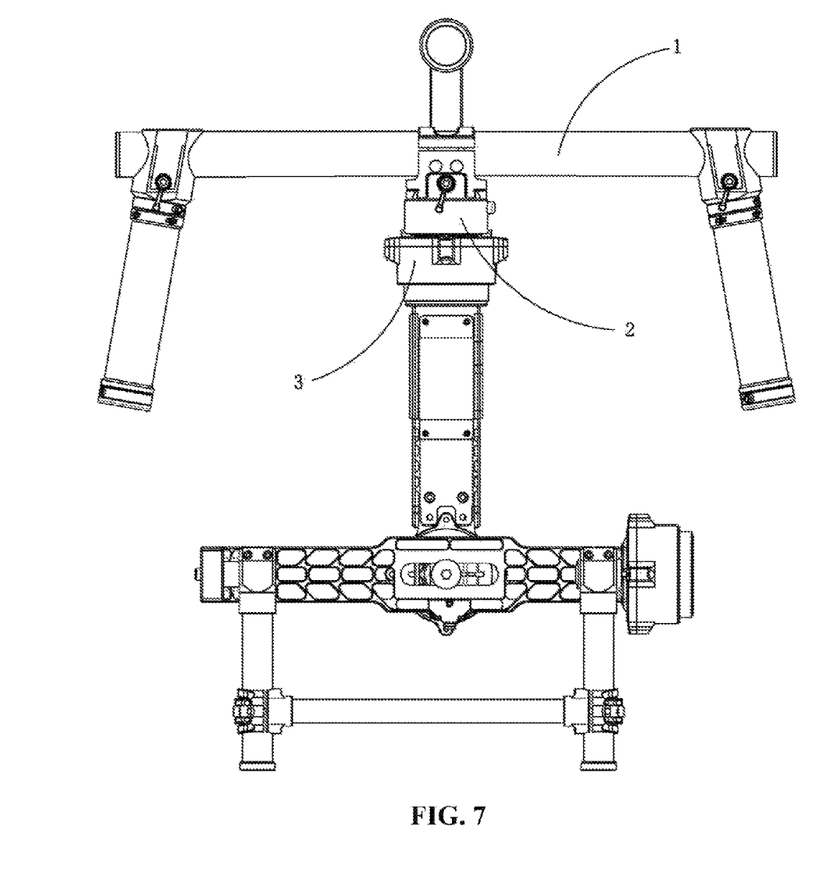
FIG. 7 is a view showing a structure of a gimbal apparatus according to an embodiment of the present disclosure.

FIG. 7 is a view showing a structure of a gimbal apparatus according to an embodiment of the present disclosure. In some embodiments, as shown in FIG. 7, the gimbal apparatus can comprise a supporting device 1, a connecting device 2, and an imaging adjusting device 3. The imaging adjusting device can be a tri-axial gimbal device, and the supporting device can be a handheld supporting device. The connecting device can be a connecting device consistent with the present disclosure, such as one of the exemplary connecting devices described above. For example, the connecting device can comprise a connecting member, a slider, and a blocking assembly.

The blocking assembly can comprise a limiting column and a limiting button. The limiting button can comprise a sliding portion and a transmission portion, and the limiting column can be provided with a receiving hole for receiving the transmission portion.

A first end of the connecting member can be provided with a fastening portion configured to engage with the supporting device, and a second end, which is opposite to the first end, of the connecting member can be provided with a first sliding slot and a limiting slot for accommodating the limiting column.

A first end of the slider can be provided with a second sliding slot configured to slidably engage with the first sliding slot and an accommodating hole for accommodating the limiting column. A side wall of the slider can be provided with a through hole, which communicates with the accommodating hole and is configured to receive the transmission portion. The through hole can guide the transmission portion to slide in the through hole.

A second end of the slider can be provided with a locking member for locking the imaging adjusting device.

As shown in FIG. 7, the supporting device can comprise a supporting rod, three handles, and corresponding connecting mechanisms. The fastening portion of the connecting device can engage with the supporting rod, such that the connecting device and the imaging adjusting device, which is locked to the connecting device, can be connected to the supporting rod.

The locking member provided on the slider of the connecting device can engage with a rotation shaft of a motor provided at the imaging adjusting device, so as to connect the imaging adjusting device with the connecting device.

The imaging adjusting device can be attached to or detached from the supporting device by sliding the second sliding slot relative to the first sliding slot.

In some embodiments, the first sliding slot of the connecting member can be a sliding guide slot formed by a first protrusion portion and a second protrusion portion disposed opposite to each other at the second end of the connecting member. The second sliding slot of the slider can be a sliding protrusion configured to engage with the sliding guide slot.

In some embodiments, the connecting device can further comprise a clamping block and a clamping bolt.

A side wall of the connecting member can be provided with a receiving recess formed through the first protrusion portion and configured to receive the clamping block. A bolt hole can be provided at the bottom of the receiving recess.

The clamping block can be provided with a through hole which corresponds to the bolt hole. The clamping bolt can pass through the through hole and fits in the bolt hole.

One end of the clamping block can comprise an abutting protrusion that can abut against the sliding protrusion of the slider.

In some embodiments, the connecting device can further comprise an elastic member. One end of the elastic member can be arranged in the accommodating hole, and the other end of the elastic member can be connected to the limiting column.

In some embodiments, the first sliding slot and the second sliding slot of the connecting device can be dovetail slots configured to engage with each other. In other embodiments, the first sliding slot and the second sliding slot of the connecting device can be T-slots configured to engage with each other.

In some embodiments, the fastening portion of the connecting member of the connecting device can be provided with a clamping hole. A side of the fastening portion can be provided with a through slot which communicates with the clamping hole. The through slot can be locked by a screw.

The structural details of parts of the connecting device and the connection relation therebetween are provided in the exemplary embodiments described above with reference to FIGS. 1 to 6, which are omitted here for conciseness.

Consistent with embodiments of the present disclosure, components such as dovetail slot and T-slot and components for limiting positions are used to enable quick disassembly and quick assembly of a gimbal, such that the gimbal can be rapidly dismounted from and mounted on various supporting devices such as those used on aerial vehicles, handheld devices, and vehicles. Consistent with embodiments of the present disclosure, a guiding is implemented by structures such as a dovetail slot and a T-slot. A direction of adjustment is determinate and an operation is easy. Furthermore, a locking mechanism having a clamping block is used to provide a reliable and stable connection, which is easy to operate.

The foregoing description is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A connecting device, comprising:
a connecting member comprising a first sliding slot and a limiting slot formed at one end of the connecting member;
a slider comprising:
    a second sliding slot and an accommodating hole formed at one end of the slider, the second sliding slot being configured to slidably engage with the
    first sliding slot; and a through hole formed on a side wall of the slider and configured to communicate with the accommodating hole; a blocking assembly comprising:
    a limiting button comprising a transmission portion configured to be received in the through hole and be guided to slide in the through hole;
    a limiting column configured to be accommodated in the limiting slot and the accommodating hole, the limiting column comprising a receiving hole configured to receive the transmission portion;
wherein the first sliding slot includes a sliding guide slot formed by a first protrusion portion and a second protrusion portion arranged opposite to each other at the one end of the connecting member;
wherein the second sliding slot includes a sliding protrusion configured to engage with the sliding guide slot;
a clamping block;
a clamping bolt,
wherein:
    the connecting member further comprises a receiving recess formed on a side wall of the connecting member and through the first protrusion portion, the receiving recess being configured to receive the clamping block, and the receiving recess comprising a bolt hole formed at a bottom of the receiving recess,
    the clamping block comprises a through hole corresponding to the bolt hole, and the clamping bolt is configured to pass through the through hole and fit in the bolt hole, and
    the clamping block comprises an abutting protrusion at one end of the clamping block, and the abutting protrusion is configured to abut against the sliding protrusion.

2. The connecting device of claim 1, further comprising:
an elastic member, one end of the elastic member being arranged in the accommodating hole, and another end of the elastic member being connected to the limiting column.

3. The connecting device of claim 2, wherein the first sliding slot and the second sliding slot include dovetail slots or T-slots configured to engage with each other.

4. The connecting device of claim 1, wherein the connecting member further comprises a fastening portion formed at another end of the connecting member and configured to engage with an external supporting device.

5. The connecting device of claim 4, wherein the fastening portion comprises a clamping hole and a through slot, the through slot being formed at one side of the fastening portion, and configured to communicate with the clamping hole and to be locked by a screw.

6. The connecting device of claim 1, wherein the slider further comprises a locking member formed at another end of the slider and configured to lock an external device.

7. The connecting device of claim 1, wherein the limiting button further comprises a sliding portion connected to the transmission portion.

8. A gimbal apparatus, comprising:
a supporting device;
an imaging adjusting device; and
a connecting device configured to connect the supporting device and the imaging adjusting device, the connecting device comprising:
  a connecting member comprising:
    a fastening portion formed at a first end of the connecting member and configured to engage with the supporting device; and
    a first sliding slot and a limiting slot formed at a second end of the connecting member;
  a slider comprising:
    a second sliding slot and an accommodating hole formed at a first end of the slider, the second sliding slot being configured to slidably engage with the first sliding slot;
    a locking member formed at a second end of the slider and configured to lock the imaging adjusting device; and
    a through hole formed on a side wall of the slider and configured to communicate with the accommodating hole;
  a blocking assembly comprising:
    a limiting button comprising a transmission portion configured to be received in the through hole and be guided to slide in the through hole;
    a limiting column configured to be accommodated in the limiting slot and the accommodating hole, the limiting column comprising a receiving hole configured to receive the transmission portion;
  wherein the first sliding slot includes a sliding guide slot formed by a first protrusion portion and a second protrusion portion arranged opposite to each other at the second end of the connecting member; and
  wherein the second sliding slot includes a sliding protrusion configured to engage with the sliding guide slot;
  the connecting device further comprises a clamping block and a clamping bolt,
  the connecting member further comprises a receiving recess formed on a side wall of the connecting member and through the first protrusion portion, the receiving recess being configured to receive the clamping block, and the receiving recess comprising a bolt hole formed at a bottom of the receiving recess,
  the clamping block comprises a through hole corresponding to the bolt hole, and the clamping bolt is configured to pass through the through hole and fit in the bolt hole, and
  the clamping block comprises an abutting protrusion at one end of the clamping block, and the abutting protrusion is configured to abut against the sliding protrusion.

9. The gimbal apparatus of claim 8, wherein the connecting device further comprises an elastic member, one end of the elastic member being arranged in the accommodating hole, and another end of the elastic member being connected to the limiting column.

10. The gimbal apparatus of claim 9, wherein the first sliding slot and the second sliding slot include dovetail slots or T-slots configured to engage with each other.

11. The gimbal apparatus of claim 8, wherein the fastening portion comprises a clamping hole and a through slot, the through slot being formed at one side of the fastening portion, and configured to communicate with the clamping hole and to be locked by a screw.

12. The connecting device of claim 8, wherein the limiting button further comprises a sliding portion connected to the transmission portion.

* * * * *